United States Patent [19]

Meguerian et al.

[11] 4,350,615
[45] Sep. 21, 1982

[54] CATALYTIC CRACKING WITH REDUCED EMISSION OF NOXIOUS GAS

[75] Inventors: Garbis H. Meguerian, Olympia Fields; John M. Lorntson, Will County; Iacovos A. Vasalos, Downers Grove, all of Ill.

[73] Assignee: Standard Oil Company (Indiana), Chicago, Ill.

[21] Appl. No.: 212,883

[22] Filed: Dec. 4, 1980

Related U.S. Application Data

[62] Division of Ser. No. 84,141, Oct. 12, 1979, Pat. No. 4,300,997.

[51] Int. Cl.$^3$ .............................................. B01J 29/12
[52] U.S. Cl. ................................................ 252/455 Z
[58] Field of Search .................................... 252/455 Z

[56] References Cited

U.S. PATENT DOCUMENTS 4,252,686  2/1981  Mooi ........................... 252/455 Z
4,259,176  3/1981  Blanton et al. ............... 252/455 Z

*Primary Examiner*—Carl F. Dees
*Attorney, Agent, or Firm*—Richard A. Kretchmer; William T. McClain; William H. Magidson

[57] ABSTRACT

Small amounts of a promoter comprising palladium and ruthenium enhance the combustion of carbon monoxide within the regeneration zone of a catalytic cracking unit without simultaneously causing the formation of excessive amounts of nitrogen oxides. The palladium-ruthenium promoter also enhances the capture of sulfur oxides by suitable absorbents within the regeneration zone of a catalytic cracking unit without causing the formation of excessive amounts of nitrogen oxides. The ratio by weight on an elemental metal basis of palladium to ruthenium is from about 0.1 to about 10.

8 Claims, 1 Drawing Figure

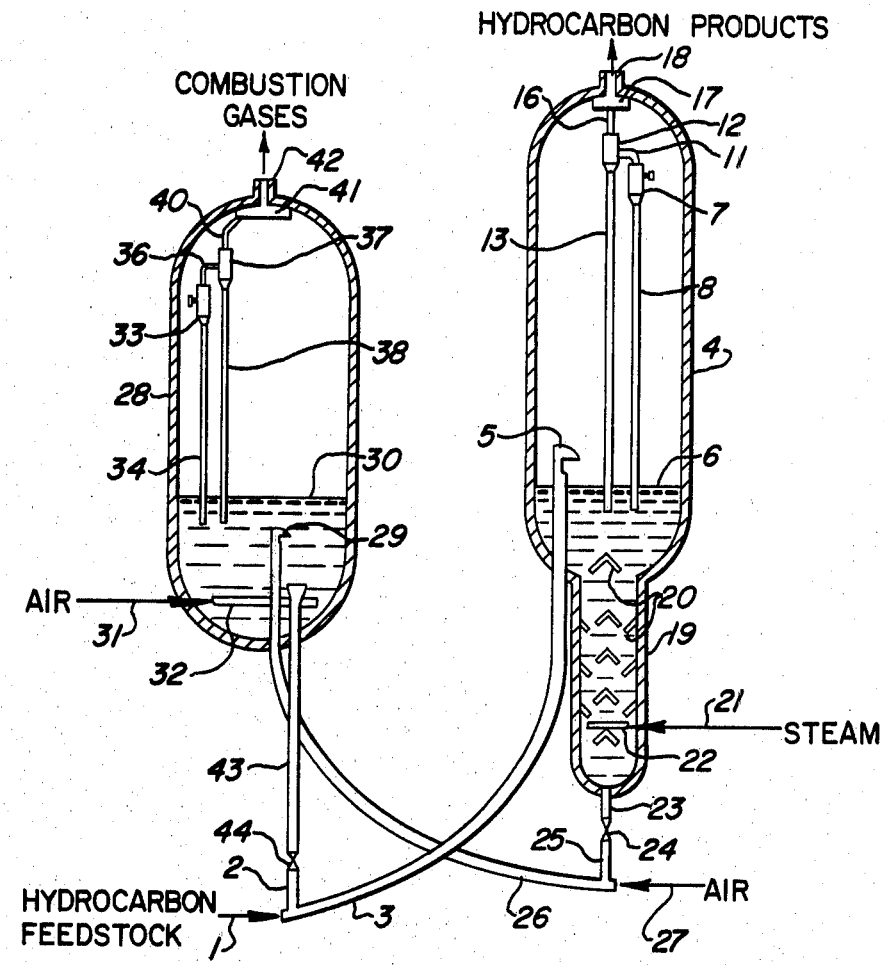

CATALYTIC CRACKING WITH REDUCED EMISSION OF NOXIOUS GAS

This is a division, of application Ser. No. 84,141, filed Oct. 12, 1979, now U.S. Pat. No. 4,300,997.

BACKGROUND OF THE INVENTION

1. Field of the Invention

This invention relates to a process for reducing emissions of carbon monoxide and sulfur oxides from the regenerator of a catalytic cracking unit. More particularly, the invention relates to the regeneration of deactivated cracking catalyst in the presence of a minor amount of palladium and ruthenium.

2. Description of the Prior Art

A major industrial problem involves the development of efficient methods for reducing the concentration of air pollutants, such as carbon monoxide and sulfur oxides, in waste gas streams which result from the processing and combustion of sulfur and carbon containing fuels. The discharge of these waste gas streams into the atmosphere is environmentally undesirable at the sulfur oxide and carbon monoxide concentrations which are frequently encountered in conventional operations. The regeneration of cracking catalyst, which has been deactivated by coke deposits in the catalytic cracking of sulfur-containing hydrocarbon feedstocks, is a typical example of a process which can result in a waste gas stream containing relatively high levels of both carbon monoxide and sulfur oxides.

Catalytic cracking of heavy petroleum fractions is one of the major refining operations employed in the conversion of crude petroleum oils to useful products such as the fuels utilized by internal combustion engines. In fluidized catalytic cracking processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some non-volatile carbonaceous material or coke is deposited on the catalyst particles. Coke comprises highly condensed aromatic hydrocarbons and generally contains from about 4 to about 10 weight percent hydrogen. When the hydrocarbon feedstock contains organic sulfur compounds, the coke also contains sulfur. As coke accumulates on the cracking catalyst, the activity of the catalyst for cracking and the selectivity of the catalyst for producing gasoline blending stocks diminishes.

Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas such as air. The combustion of these coke deposits can be regarded, in a simplified manner, as the oxidation of carbon according to the following equations:

$$C + O_2 \rightarrow CO_2 \tag{1}$$

$$2C + O_2 \rightarrow 2CO \tag{2}$$

$$2CO + O_2 \rightarrow 2CO_2 \tag{3}$$

Reactions (1) and (2) both occur under typical catalyst regeneration conditions wherein the catalyst temperature usually ranges from about 565° to about 815° C. The combustion of carbon monoxide to carbon dioxide according to reaction (3) proceeds only at temperatures above about 595° C. Consequently, the incomplete combustion of carbon monoxide during catalyst regeneration can result in significant concentrations of carbon monoxide in the regeneration zone effluent gas. The discharge of this carbon monoxide into the atmosphere is undesirable, not only from an environmental point of view, but also because it represents a wasted source of heat energy. The combustion of carbon monoxide yields approximately 4,350 B.T.U. per pound.

When sulfur-containing feedstocks, such as petroleum hydrocarbons containing sulfur compounds, are utilized in a catalytic cracking process, the coke deposited on the catalyst contains sulfur. During regeneration of the coked deactivated catalyst, the coke is burned from the catalyst surfaces which results in the conversion of the sulfur to sulfur dioxide together with small amounts of sulfur trioxide. This burning can be represented, in a simplified manner, as the oxidation of sulfur according to the following equations:

$$S(\text{in coke}) + O_2 \rightarrow SO_2 \tag{4}$$

$$2SO_2 + O_2 \rightarrow 2SO_3 \tag{5}$$

The removal of carbon monoxide from the waste gas produced during the regeneration of deactivated cracking catalyst can be accomplished by conversion of the carbon monoxide to carbon dioxide in a separate zone or carbon monoxide boiler after separation of the regeneration zone effluent gas from the catalyst. This approach is described, for example, in U.S. Pat. No. 2,753,925 to Campbell et al. Such methods, however, require complex auxiliary equipment which serves to increase operating and capital costs.

An alternative approach to the control of carbon monoxide emissions from the regeneration of cracking catalyst is set forth in U.S. Pat. No. 3,909,392 to Horecky et al. This patent discloses a process wherein the essentially complete combustion of carbon monoxide to carbon dioxide is carried out within the regeneration zone with recovery of the resulting heat by direct transfer to the catalyst particles. In addition, the patent also teaches the use of combustion catalysts within the regeneration zone to promote the combustion of carbon monoxide. These combustion catalysts include a metallic bar, mesh network, or screen in the regeneration zone; and fluidizable metal compounds, particularly powdered oxides of transition group metals such as ferric oxide, manganese dioxide and rare earth oxides. This approach not only substantially eliminates carbon monoxide emissions, but also permits the preparation of regenerated catalyst having an extremely low content of residual coke, reduces or eliminates the need to preheat the hydrocarbon feedstock, and results in improved yields of more valuable products.

British Pat. No. 1,499,682 is directed to a catalytic cracking process involving the use of a cracking catalyst in association with a carbon monoxide oxidation promoter which is a metal having an atomic number of at least 20. Among others, it is disclosed that platinum, palladium and rhodium are active oxidation promoters.

German Offenlegungsschrift No. 2,444,911 and its counterparts U.S. Pat. Nos. 4,072,600; 4,088,568 and 4,093,535 to Schwartz, disclose that a cracking catalyst containing less than 100 parts per million, calculated as metal and based on total catalyst, of at least one metal component selected from the group consisting of the metals of Periods 5 and 6 of Group VIII of the Periodic Table and rhenium or their compounds is effective in reducing the carbon monoxide content of effluent gas derived from the regeneration of cracking catalyst. Similarly, U.S. Pat. No. 4,064,037 to Graven et al., U.S. Pat. No. 4,064,039 to Penick and U.S. Pat. No. 4,107,032 to Chester also disclose the use of platinum group metals and rhenium to promote the combustion of carbon monoxide within the regeneration zone of a fluidized catalytic cracking unit.

One approach to the removal of sulfur oxides from a waste gas stream involves scrubbing the gas with an inexpensive alkaline material, such as lime or limestone, which reacts chemically with the sulfur oxides to give a nonvolatile product which is discarded. Unfortunately, this approach requires a large and continual supply of alkaline scrubbing material, and the resulting reaction products can create a solid waste disposal problem of substantial magnitude. In addition, this approach requires complex and expensive auxiliary equipment.

A second approach to the control of sulfur oxide emissions involves the use of sulfur oxide absorbents which can be regenerated either thermally or chemically. An example of this approach to the removal of sulfur oxides from the regeneration zone effluent gas stream in a cyclic, fluidized, catalytic cracking process is set forth in U.S. Pat. No. 3,835,031 to Bertolacini et al. This patent discloses the use of a zeolite-type cracking catalyst which is modified by impregnation with one or more metal compounds of Group IIA of the Periodic Table, followed by calcination, to provide from about 0.25 to about 5.0 weight percent of Group IIA metal or metals as an oxide or oxides. The metal oxide or oxides react with sulfur oxides in the regeneration zone to form nonvolatile inorganic sulfur compounds. These nonvolatile inorganic sulfur compounds are then converted to the metal oxide or oxides and hydrogen sulfide upon exposure to hydrocarbons and steam in the reaction and stripping zones of the process unit. The resulting hydrogen sulfide is disposed of in equipment which is conventionally associated with a fluidized catalytic cracking process unit. Belgian Pat. No. 849,637 is also directed to a process wherein a Group IIA metal or metals are circulated through a cyclic fluidized catalytic cracking process with the cracking catalyst in order to reduce the sulfur oxide emissions resulting from regeneration of deactivated catalyst.

U.S. Pat. No. 4,153,534 to Vasalos discloses a process similar to that set forth in U.S. Pat. No. 3,835,031, which involves the removal of sulfur oxides from the regeneration zone flue gas of a cyclic, fluidized, catalytic cracking unit through the use of a zeolite-type cracking catalyst in combination with a regenerable sulfur oxide absorbent which absorbs sulfur oxides in the regeneration zone and releases the absorbed sulfur oxides as a sulfur-containing gas in the reaction and stripping zones of the process unit. The sulfur oxide absorbent comprises at least one free or combined element selected from the group consisting of sodium, scandium, titanium, chromium, molybdenum, manganese, cobalt, nickel, antimony, copper, zinc, cadmium, the rate earth metals and lead.

U.S. Pat. No. 4,071,436 to Blanton et al. teaches that alumina and/or magnesia can be used to absorb sulfur oxides from a gas at a temperature in the range from 1000° to 1500° F. and the absorbed sulfur oxides can be removed by treatment with a hydrocarbon at a temperature in the range from 800° to 1300° F. It is further disclosed that sulfur oxide emissions from the regeneration zone of a cyclic, fluidized, catalytic cracking unit can be reduced by combining alumina and/or magnesia with the hydrocarbon cracking catalyst. Similarly, U.S. Pat. No. 4,115,249 to Blanton et al. teaches that a cracking catalyst can be impregnated with an aluminum compound and utilized in a cyclic, fluidized, catalytic cracking process for the purpose of reducing regenerator sulfur oxide emissions.

U.S. Patent Application Ser. No. 29,264 by Bertolacini et al. discloses a process for the removal of sulfur oxides from a gas by an absorbent comprising at least one inorganic oxide selected from the group consisting of the oxides of aluminum, magnesium, zinc, titanium and calcium in association with at least one free or combined rare earth metal selected from the group consisting of lanthanum, cerium, praseodymium, samarium and dysprosium, wherein the ratio by weight of inorganic oxide or oxides to rare earth metal or metals is from about 0.1 to about 30,000. Absorbed sulfur oxides are recovered as a sulfur-containing gas comprising hydrogen sulfide by contacting the spent absorbent with a hydrocarbon in the presence of a hydrocarbon cracking catalyst at a temperature from about 375° to about 900° C. It is further disclosed that the absorbent can be circulated through a fluidized catalyst cracking process together with the hydrocarbon cracking catalyst to reduce sulfur oxide emissions from the catalyst regeneration zone.

An approach to the simultaneous control of carbon monoxide and sulfur oxide emissions from the regeneration of cracking catalyst is set forth in U.S. Pat. No. 4,153,535 to Vasalos et al. This patent discloses the circulation of a sulfur oxide absorbent through the catalytic cracking process with cracking catalyst and regeneration of the cracking catalyst in the presence of a metallic promoter. The promoter comprises at least one free or combined metal selected from the group consisting of ruthenium, rhodium, palladium, osmium, iridium, platinum, vanadium, tungsten, uranium, zirconium, rhenium and silver. The sulfur oxide absorbent comprises at least one free or combined element which is selected from the group consisting of sodium, magnesium, calcium, strontium, barium, scandium, titanium, chromium, molybdenum, manganese, cobalt, nickel, antimony, copper, zinc, cadmium, lead and the rare earth metals. The metallic promoter serves to enhance the ability of the absorbent to absorb sulfur oxides in the regeneration zone of a cyclic, fluidized, catalytic cracking unit and also serves to enhance the combustion of carbon monoxide within the catalyst regeneration zone.

Similarly, U.S. Pat. No. 4,146,463 to Radford et al. discloses a process wherein a separately generated waste gas containing sulfur oxides and/or carbon monoxide is conveyed to the regeneration zone of a cyclic, fluidized, catalytic cracking unit where these pollutants are removed by contact with a sulfur oxide absorbent and an oxidation promoter, wherein the absorbent is a metal oxide which reacts with the sulfur oxides to form nonvolatile inorganic sulfur compounds and the promoter consists of at least one free or combined metallic element selected from Groups IB, IIB and III-VIII of the Periodic Table.

U.S. Pat. No. 4,115,250 to Flanders et al. describes the use of alumina to absorb sulfur oxides in the regeneration zone of a fluidized catalytic cracking unit while the combustion of carbon monoxide is simultaneously catalyzed by an oxidation promoter comprising a metal or compound of a metal selected from platinum, palladium, iridium, rhodium, osmium, ruthenium, copper and chromium.

The use of combustion promoters, particularly trace amounts of platinum, has recently found wide acceptance in the refining industry for the purpose of enhancing the combustion of carbon monoxide within the catalyst regeneration zone of a fluidized catalytic cracking unit. Unfortunately, the more active combustion promoters such as platinum and palladium also serve to promote the formation of nitrogen oxides in the regeneration zone. Since the discharge of nitrogen oxides into the atmosphere is environmentally undesirable, the use of these promoters has the effect of substituting one undesirable emission for another. In a conventional process for the regeneration of cracking catalyst which does not involve any significant carbon monoxide combustion, the regeneration zone effluent gas will contain from about 6 to 12 volume percent of carbon monoxide and from less than about 10 parts per million by volume (ppmv) to about 40 ppmv of nitrogen oxides. For a hydrocarbon feedstock containing about 0.08 weight percent nitrogen, the nitrogen oxide content of the regeneration zone flue gas will ordinarily be less than 10 ppmv when conventional regeneration is employed. The incorporation of 0.1 parts per million by weight (ppm) of platinum into the cracking catalyst can increase the nitrogen oxide content of the regeneration zone flue gas for this feedstock to the 100–200 ppmv range, and 1.5 ppm of platinum can increase the nitrogen oxide levels as high as about 900 ppmv.

If a platinum or palladium combustion promoter is employed solely for the purpose of enhancing the combustion of carbon monoxide within the catalyst regeneration zone of a fluidized catalytic cracking unit, the resulting increase in formation of nitrogen oxides, although undesirable, may be tolerable because of the very small amount of promoter required. However, our tests show that if the promoter is additionally used to enhance the ability of a sulfur oxide absorbent to absorb sulfur oxides in the regeneration zone, larger amounts of the promoter are frequently required and can result in the formation of intolerable amounts of nitrogen oxides.

Two nitrogen oxides, nitric oxide (NO) and nitrogen dioxide ($NO_2$) are formed during the regeneration of cracking catalyst, and both are significant air pollutants. The U.S. Occupational Safety and Health Administration considers these oxides to be health hazards at 25 ppmv for NO and 5 ppmv for $NO_2$. In addition, both oxides have been implicated in the formation of smog by photochemical reaction with hydrocarbons in the atmosphere. The term $NO_x$, in common practice, refers to the sum of NO plus $NO_2$.

When nitrogen containing feedstocks, such as petroleum hydrocarbons which contain organic nitrogen compounds, are used in a catalytic cracking process, the coke deposited on the catalyst contains nitrogen. This nitrogen in the coke represents one possible source of $NO_x$ in the regeneration zone effluent gas stream. In addition, molecular nitrogen from the combustion air represents a second possible source. On the basis of thermodynamic considerations, however, it is probable that organic nitrogen compounds in the coke will react with oxygen much more readily than molecular nitrogen to form $NO_x$. At regeneration zone temperatures of about 705° C., thermodynamic equilibrium calculations demonstrate that less than 100 ppmv of $NO_x$ can be attributed to the oxidation of molecular nitrogen. Since the use of a platinum combustion promoter can afford a regeneration zone effluent gas containing as much as 900 ppmv of $NO_x$, it appears that a major portion of the $NO_x$ produced in the presence of platinum originates with the nitrogen in coke.

An article entitled "Reduction of Nitric Oxide by Monolithic-Supported Palladium-Nickel and Palladium-Ruthenium Alloys" by Bartholomew in Ind. Eng. Chem., Prod. Res. Dev., Vol. 14, No. 1, 1975, at pages 29–33, is addressed to an evaluation of the performance of monolithic-supported palladium-nickel and palladium-ruthenium alloys as catalysts for the removal of $NO_x$ from a reducing gas such as the exhaust gas from an internal combustion engine. This reference does not, however, suggest that a combination of palladium and ruthenium could be utilized to reduce or otherwise affect the $NO_x$ emissions produced in an oxidizing environment of the type found in the regeneration zone of a fluidized catalytic cracking unit. In addition, the reference is directed to the treatment of a preformed waste gas stream and does not suggest the desirability of incorporating a mixture of palladium and ruthenium into a combustion zone, such as the regenerator of a catalytic cracking unit, wherein a waste gas stream is generated in the presence of the palladium-ruthenium combination.

SUMMARY OF THE INVENTION

This invention is directed to a process for the fluidized catalytic cracking of a hydrocarbon feedstock wherein (i) said feedstock is subjected to cracking in the reaction zone through contact with a particulate cracking catalyst; (ii) cracking catalyst, which is deactivated by coke deposits, is separated from reaction zone hydrocarbon effluent and passes to a stripping zone wherein volatile deposits are removed from said catalyst by contact with a stripping gas; (iii) stripped catalyst is separated from stripping zone effluent and passes to a catalyst regeneration zone and coke deposits are removed from the stripped catalyst by burning with an oxygen-containing regeneration gas thereby forming carbon monoxide and carbon dioxide; and (iv) resulting regenerated catalyst is separated from regeneration zone effluent gas and recycled to the reaction zone; and wherein emissions of carbon monoxide in the regeneration zone effluent gas are reduced by the method which comprises reacting carbon monoxide and oxygen to form carbon dioxide in said regeneration zone in contact with an oxidation promoter comprising palladium in association with ruthenium, wherein the palladium and ruthenium are in free or combined form, the ratio by weight on an elemental metal basis of palladium to ruthenium is from about 0.1 to about 10, and the oxidation promoter is present in a minor amount effective to enhance the oxidation of carbon monoxide to carbon dioxide.

Another embodiment of the invention is a process for the fluidized catalytic cracking of a hydrocarbon feedstock containing organic sulfur compounds wherein (i) said feedstock is subjected to cracking in a reaction zone through contact with a particulate cracking catalyst; (ii) cracking catalyst, which is deactivated by sulfur-containing coke deposits, is separated from reaction zone hydrocarbon effluent and passes to a stripping zone wherein volatile deposits are removed from said catalyst by contact with a stripping gas comprising steam; (iii) stripped catalyst is separated from stripping zone effluent and passes to a catalyst regeneration zone and sulfur-containing coke deposits are removed from the stripped catalyst by burning with an oxygen-containing regeneration gas thereby forming carbon monoxide, carbon dioxide and sulfur oxides; and (iv) resulting regenerated catalyst is separated from regeneration zone effluent gas and recycled to the reaction zone; and wherein emissions of carbon monoxide and sulfur oxides in the regeneration zone effluent gas are reduced by the method which comprises: (a) reacting carbon monoxide and oxygen to form carbon dioxide in said regeneration zone in contact with an oxidation promoter comprising palladium in association with ruthenium, wherein the palladium and ruthenium are in free or combined form and the ratio by weight of an elemental metal basis of palladium to ruthenium is from about 0.1 to about 10; (b) absorbing sulfur oxides in said regeneration zone with fluidizable particulate solids which comprise at least one metal oxide selected from the group consisting of the oxides of aluminum, sodium, magnesium, calcium, strontium, barium, scandium, titanium, chromium, molybdenum, manganese, cobalt, nickel, antimony, copper, zinc, cadmium and the rare earth metals, wherein said oxidation promoter is present in sufficient amount to enhance said absorption of sulfur oxides and the oxidation of carbon monoxide to carbon dioxide in the regeneration zone; and (c) removing said absorbed sulfur oxides from the fluidizable particulate solids as a sulfur-containing gas which comprises hydrogen sulfide by contacting said particulate solids with the hydrocarbon feedstock in said reaction zone.

In a further embodiment, the present invention relates to a composition of matter comprising a particulate physical mixture of (a) a particulate zeolite-type cracking catalyst; and (b) a particulate solid other than said cracking catalyst comprising an inorganic oxide in association with palladium and ruthenium, wherein the palladium and ruthenium are in free or combined form, the ratio by weight on an elemental basis of palladium to ruthenium is from about 0.1 to about 10, the combined amount of palladium and ruthenium is from about 0.001 to about 10 weight percent with respect to the particulate solid other than said cracking catalyst, and the combined amount of palladium and ruthenium is from about 0.01 to about 100 parts per million by weight with respect to said particulate physical mixture.

It has been discovered that the palladium-ruthenium oxidation promoter of this invention can be used to efficiently promote the combustion of carbon monoxide to carbon dioxide within the regeneration zone of a catalytic cracking unit without simultaneously causing formation of the excessive amounts of $NO_x$ which have been a disadvantage of prior art promoters. Accordingly, it is an object of this invention to provide an improved composition of matter for use in promoting the combustion of carbon monoxide within the regeneration zone of a catalytic cracking unit.

It has also been discovered that the palladium-ruthenium oxidation promoter of this invention efficiently promotes the capture of sulfur oxides by suitable absorbents within the regeneration zone of a catalytic cracking unit without simultaneously causing formation of the excessive amounts of $NO_x$ which have been a disadvantage of prior art promoters. Accordingly, it is an object of this invention to provide an improved composition of matter for use in reducing emissions of sulfur oxides from the regeneration zone of a catalytic cracking unit.

Another object of this invention is to provide an improved process for the catalyzed combustion of carbon monoxide within the regeneration zone of a catalytic cracking unit which does not result in excessive $NO_x$ emissions.

A further object of the invention is to provide an improved process for reducing sulfur oxide emissions from the regeneration of cracking catalyst which does not produce excessive $NO_x$ emissions.

Other objects, aspects and advantages of the invention will be readily apparent from the following detailed description and claims.

DESCRIPTION OF THE DRAWING

The attached drawing is a schematic representation of a fluidized catalytic cracking process.

DETAILED DESCRIPTION OF THE INVENTION

It has been discovered that a composition comprising palladium in association with ruthenium is a highly effective oxidation promoter which has a reduced tendency to cause the formation of $NO_x$ when used in the catalyst regeneration zone of a catalytic cracking process. The palladium and ruthenium can be in either free or combined form, although the free metals or their oxides are believed to be most active and are preferred. SOn an elemental metal basis, the ratio by weight of palladium to ruthenium is desirably from about 0.1 to about 10, preferably from about 1.0 to about 10, more preferably from about 2.0 to about 10, and most preferably about 5. At these ratios, the most favorable balance is achieved within the regeneration zone between minimized $NO_x$ formation and maximized promotion of carbon monoxide combustion.

The palladium-ruthenium oxidation promoter of this invention can be either confined in the catalyst regeneration zone of a fluidized catalytic cracking unit or circulated through the catalytic cracking process cycle with the cracking catalyst. The oxidation promoter of this invention is so highly active in promoting the oxidation of carbon monoxide to carbon dioxide and in promoting the capture of sulfur oxides by suitable absorbents that no more than trace amounts are required within the regeneration zone. These amounts are so small that their presence in the hydrocarbon cracking zone does not significantly affect either the nature of the products or the cracking catalyst activity. Consequently, it is highly preferable to circulate the oxidation promoter through the cracking process in combination with the cracking catalyst. This can be accomplished by incorporation of the palladium-ruthenium promoter either into or onto the particles of cracking catalyst. Alternatively, and more preferably, the particles of cracking catalyst can be physically mixed with a separate particulate solid or solids which comprise the palladium-ruthenium promoter. The use of a separate particulate solid or solids permits a rapid and convenient adjustment of the promoter concentration in the circulating mixture of particles. In addition, the use of a separate particulate solid or solids which comprise the promoter permits a refiner to continue in the use of conventional cracking catalysts.

Suitable hydrocarbon cracking catalysts for use in the practice of this invention include all high-activity solid catalysts which are stable under the required conditions. Suitable catalysts include those of the amorphous silica-alumina type having an alumina content of about 10 to about 30 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite-type cracking catalysts are preferred because of their thermal stability and high catalytic activity.

The crystalline aluminosilicate or zeolite component of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007) and ultrastable large-pore zeolites (U.S. Pat. Nos. 3,293,192 and 3,449,070). The crystalline aluminosilicates having a faujasite-type crystal structure are particularly suitable and include natural faujasite, Zeolite X and Zeolite Y. These zeolites are usually prepared or occur naturally in the sodium form. The presence of this sodium is undesirable, however, since the sodium zeolites have a low catalytic activity and also a low stability at elevated temperatures in the presence of steam. Consequently, for use in this invention the sodium content of the zeolite is ordinarily reduced to the smallest possible value, generally less than about 1.0 weight percent and preferably below about 0.3 weight percent through ion exchange with hydrogen ions, hydrogenprecursors such as ammonium ion, or polyvalent metal cations including calcium, magnesium, strontium, barium and the rare earth metals such as cerium, lanthanum, neodymium and their mixtures. Suitable zeolites are able to maintain their pore structure under the high temperature conditions of catalyst manufacture, hydrocarbon processing and catalyst regeneration. These materials have a uniform pore structure of exceedingly small size, the cross-section diameter of the pores being in the range from about 4 to about 20 angstroms, preferably from about 8 to about 15 angstroms.

The matrix of the zeolite-type cracking catalyst is a porous refractory material within which the zeolite component is dispersed. Suitable matrix materials can be either synthetic or naturally occurring and include, but are not limited to, silica, alumina, magnesia, boria, bauxite, titania, natural and treated clays, kieselguhr, diatomaceous earth, kaolin and mullite. Mixtures of two or more of these materials are also suitable. Particularly suitable matrix materials comprise mixtures of silica and alumina, mixtures of silica with alumina and magnesia, and also mixtures of silica and alumina in combination with natural clays and claylike materials. Mixtures of silica and alumina are preferred, however, and contain preferably from about 10 to about 65 weight percent of alumina mixed with from about 35 to about 90 weight percent of silica, and more preferably from about 25 to about 65 weight percent of alumina mixed with from about 35 to about 75 weight percent of silica.

According to one aspect of this invention, the palladium-ruthenium oxidation promoter is utilized in the regeneration zone of a catalytic cracking unit to promote the combustion of carbon monoxide. The promoter is used in a minor amount which is effective to promote the combustion of carbon monoxide at regeneration temperature. In those embodiments wherein the promoter is circulated through the process cycle with cracking catalyst, the combined amount of palladium and ruthenium, calculated as the elemental metals, is desirably from about 0.01 to about 100 ppm, and preferably from about 0.1 to about 25 ppm with respect to the cracking catalyst and any admixed solids.

In the practice of this invention, the palladium and ruthenium can be combined in any suitable manner. Although the palladium and ruthenium can be intimately associated, as in an alloy, this is not a requirement. It is necessary only that both the palladium and ruthenium can simultaneously contact the combustion gases as they are produced during catalyst regeneration.

When the palladium and ruthenium of this invention are contained in particulate solids, the particles of cracking catalyst can contain both the palladium and the ruthenium. Alternatively, the particles of cracking catalyst can contain the palladium and be physically mixed with a separate particulate solid which contains the ruthenium. As a further alternative, the particles of cracking catalyst can contain the ruthenium and be physically mixed with a separate particulate solid which contains the palladium. A still further alternative involves the use of a particulate cracking catalyst which is physically mixed with a separate particulate solid which contains both the palladium and the ruthenium. Finally, a physical mixture of three different particulate solids can also be employed wherein one particulate solid comprises the cracking catalyst, the second particulate solid contains the palladium, and the third particulate solid contains the ruthenium. It will, of course, be appreciated that combinations of these five different alternatives are also possible.

The palladium and ruthenium of this invention are desirably incorporated into or deposited onto a support. The use of a support permits a greater dispersal of the palladium and ruthenium within the regeneration zone and, therefore, permits a more efficient contacting of the palladium and ruthenium with the gases produced in the regeneration zone. Desirably, the support is an inorganic oxide, and suitable supports include, but are not limited to, amorphous cracking catalysts, zeolite-type cracking catalysts, silica, alumina, mixtures of silica and alumina, magnesia, mixtures of silica and magnesia, mixtures of alumina and magnesia, mixtures of alumina with magnesia and silica, titania, zinc oxide, calcium oxide, natural and treated clays, kieselguhr, diatomaceous earth, kaolin and mullite. Desirably, the support is porous and has a surface area, including the area of the pores open to the surface, of at least about 10, preferably at least about 50, and most preferably at least about 100 square meters per gram. Large surface areas are preferable because this permits a more efficient contacting of the supported palladium and ruthenium with the gases produced in the regeneration zone.

The palladium and/or ruthenium of this invention can be combined with a support either during or after preparation of the support. One method consists of impregnating a suitable support with an aqueous or organic solution or dispersion of a compound or compounds of the palladium and/or ruthenium. The impregnation can be carried out in any manner which will not destroy the structure of the support. After drying, the composite can be calcined, if desired. Alternatively, the palladium and/or ruthenium can be combined with a support precursor, such as silica gel, silica-alumina gel and alumina gel, prior to spray drying or other physical formation process. Subsequent drying and, if desired, calcination then affords the supported palladium and/or ruthenium.

The palladium and/or ruthenium can also be combined with a substrate or support by ion exchange. For example, a crystalline aluminosilicate can be ion exchanged with a solution or solutions of a compound or compounds of the palladium and/or ruthenium. This ion exchanged material can then be employed as is or can be incorporated into a porous cracking catalyst matrix. Also useful is the ion exchange of a zeolite-type cracking catalyst, siliceous solids or clays with a solution or solutions of a compound or compounds of the palladium and/or ruthenium. Suitable compounds for this purpose include but are not limited to the chlorides, nitrates, sulfates and ammine halides. Specific examples include palladium chloride, palladium nitrate, palladium sulfate and ruthenium chloride.

Although the palladium and ruthenium of this invention can be combined with a support before introduction into the catalytic cracking process cycle, it is also advantageous to introduce a compound or compounds of the palladium and/or ruthenium into the cracking process cycle and incorporate it in situ onto a support which comprises cracking catalyst. Such compound or compounds can be introduced in solution or dispersion form and in the solid, liquid or gaseous state at any stage of the cracking process cycle so that wide distribution in the circulating catalyst is achieved. For example, such compound or compounds can be admixed either with the feedstock or fluidizing gas in the reaction zone; with the regeneration gas, torch oil or spray water in the regeneration zone; with the stripping gas in the stripping zone; or can be introduced as a separate stream. If the compound or compounds are to be introduced as a separate stream, this can be accomplished by introducing the compound or compounds in the form of a solution or dispersion in either water or an organic solvent. Suitable organic solvents include but are not limited to alcohols of from 1 to 5 carbon atoms, benzene, toluene, xylene, ethyl acetate and tetrahydrofuran. Suitable compounds for in situ incorporation include metal salts, organo-metallic compounds, metal diketonates, metal carbonyls, metallocenes, olefin complexes of from 2 to 20 carbon atoms, acetylene complexes, alkyl or aryl phosphine complexes, and carboxylates of from 1 to 20 carbon atoms. Specific examples include palladium acetate, palladium 2,4-pentanedionate, palladium sulfate, palladium nitrate, palladium chloride, dichloro(ethylene)palladium(II) dimer, bromomethylbis(triethylphosphino)palladium(II), tetrakis(triphenylphosphino)palladium(O), palladium naphthenate, ruthenium(III) 2,4-pentanedionate, ruthenium chloride, and ruthenocene.

In those embodiments of the invention wherein the palladium and/or ruthenium are contained in or comprise a particulate fluidizable solid, the particles should be sufficiently strong that they are not subject to excessive attrition and degradation during fluidization. The average size of the fluidizable solid particles will be desirably in the range from about 20 microns or less to about 150 microns, and preferably less than about 50 microns.

A particularly preferred embodiment of the invention involves the catalytic cracking of a hydrocarbon feedstock in a fluidized process through contact with a physical mixture of particulate solids comprising a particulate zeolite-type cracking catalyst and a particulate solid other than said zeolite-type cracking catalyst which comprises the palladium and ruthenium in association with an inorganic oxide support. The combined amount of palladium and ruthenium, calculated as the elemental metals, is desirably from about 0.001 to about 10 weight percent and preferably from about 0.01 to about 1.0 weight percent based on the particulate solid other than cracking catalyst. In addition, the combined amount of palladium and ruthenium, calculated as the elemental metals, is desirably from about 0.01 to about 100 ppm and preferably from about 0.1 to about 25 ppm with respect to the mixture of particulate solids. Further, the zeolite-type cracking catalyst represents desirably from about 30 to about 99.999, preferably from about 50 to about 99.999, and more preferably from about 70 to about 99.99 weight percent of the mixture of particulate solids.

By adjustment of the amount of palladium-ruthenium oxidation promoter within the regeneration zone of a catalytic cracking unit, the ratio of carbon dioxide to carbon monoxide in the regeneration zone effluent gas can be conveniently controlled. If desired, the amount of promoter can be adjusted to effect a substantially complete combustion of carbon monoxide within the regeneration zone. Alternatively, in those situations wherein an enhanced carbon monoxide combustion is desired within the regeneration zone, which is less than a substantially complete combustion, the amount of promoter can be adjusted to achieve the desired ratio of carbon dioxide to carbon monoxide in the flue gas. The latter situation, wherein a partial combustion of carbon monoxide is desired, can arise, for example, in a catalytic cracking unit which has an associated carbon monoxide furnace or boiler in the flue gas circuit. If the capacity of such a unit is expanded, the associated carbon monoxide furnace or boiler is generally overloaded during operation at the expanded capacity. In this situation, the amount of palladium-ruthenium oxidation promoter can be adjusted to produce a regeneration zone effluent gas containing, for example, from about 2 to about 5% carbon monoxide rather than the approximately 6 to 12% which is typical for conventional catalyst regeneration.

Preferred embodiments of the method of this invention involve operation in conjunction with the regeneration scheme of U.S. Pat. No. 3,909,392 to Horecky et al., which is hereby incorporated in its entirety by reference. When the process of the present invention is operated in embodiments involving the regeneration scheme of U.S. Pat. No. 3,909,392, an essentially complete combustion of coke and carbon monoxide is carried out within the regeneration zone of a fluidized catalytic cracking unit, and the major portion of the resulting heat is absorbed by the solid particles comprising cracking catalyst in the regeneration zone. This heat is carried by the regenerated solid particles to the reaction zone where it is employed in the endothermic cracking of hydrocarbons. The palladium-ruthenium oxidation promoter of this invention provides a particularly convenient technique for use in initiating and sustaining the substantially complete combustion of carbon monoxide in accordance with such embodiments. The palladium-ruthenium oxidation promoter serves to lower the temperature at which a sustained combustion of carbon monoxide can be maintained and also serves to enhance the combustion of carbon monoxide within the lower dense bed of fluidized solids within the regeneration zone.

If the process of U.S. Pat. No. 3,909,392 is carried out with appreciable carbon monoxide combustion within the regeneration zone dilute phase, the dilute phase temperature can be as much as 55° C. or more above that of the lower dense phase of fluidized solids. As the proportion of carbon monoxide combustion in the lower dense phase is increased, the evolution of heat in the upper dilute phase is reduced and, consequently, the temperature of the regeneration zone dilute phase is reduced and approaches that of the dense phase. When substantially all of the carbon monoxide is combusted within the lower dense phase, the temperature of the regeneration zone effluent gas becomes substantially identical with that of the dense phase. The substantially complete combustion of carbon monoxide within the lower dense phase is particularly desirable in those situations where it is either desirable or necessary to minimize the exposure of equipment such as regenerator cyclones and flue gas lines to high temperatures. Such a situation, for example, will frequently be the case where regenerator cyclones or flue gas lines are constructed of a metal such as carbon steel which cannot ordinarily be exposed to temperatures in excess of about 650° C. for extended periods of time. The palladium-ruthenium oxidation promoter of this invention provides a particularly convenient method for initiating and sustaining the substantially complete combustion of carbon monoxide within the lower dense phase of fluidized solids in the regeneration zone. Alternatively, smaller amounts of the promoter can be employed to adjust the amount of dense phase carbon monoxide combustion to the extent desired.

In such embodiments, the regeneration gas serving to fluidize the lower dense phase contains molecular oxygen, and the oxygen is charged to the regeneration zone in an amount somewhat in excess of the stoichiometric amount required for complete combustion of coke to carbon dioxide and steam. The amount of oxygen in excess of that required for complete combustion of the coke may vary from about 0.1 to about 25 percent or more of the theoretical stoichiometric oxygen requirement for complete combustion of the coke but, advantageously, need not be greater than about 10 percent.

In such embodiments involving the process of U.S. Pat. No. 3,909,392, recovery of the heat released by the essentially complete combustion of carbon monoxide is by absorption in the catalyst particles and any associated solids which are undergoing regeneration. This heat serves to raise the temperature within the regeneration zone to a level which favors the production of a regenerated catalyst having a low content of residual coke. Accordingly, in such embodiments, regenerated catalyst suitably contains from about 0.01 to about 0.15 weight percent, desirably about 0.01 to about 0.10 weight percent, and preferably about 0.01 to about 0.05 weight percent of residual coke and can be withdrawn from the regenerator at an advantageous temperature for use in the reaction zone.

An outstanding advantage of these embodiments of the invention which involve the process of U.S. Pat. No. 3,909,392 is the production of a regenerated catalyst which generally possesses enhanced activity and selectivity characteristics closely approaching those of fresh conversion catalyst, which is particularly suited for use in conversions effected at very short contact times in transfer line reactors. The cracking activity of zeolite-type catalysts and their selectivity for converting hydrocarbon feedstocks to desired products are both dramatically affected in a favorable direction by the increased elimination of residual coke on regenerated catalyst. Consequently, a low coke level on regenerated catalyst is particularly preferred with zeolite-type cracking catalysts.

The drawing is illustrative of one embodiment of the invention involving use of the palladium-ruthenium oxidation promoter of this invention in a fluidized catalytic cracking process. The palladium and ruthenium are incorporated into the particulate cracking catalyst which is circulated through the process. A hydrocarbon feedstock from line 1 is contacted with hot regenerated catalyst from standpipe 2 in the inlet portion of transfer line 3. The resulting mixture of catalyst and hydrocarbon vapor passes upward through transfer line 3 and into reactor vessel 4. Transfer line 3 terminates in a downward directed discharge head 5. The upper surface 6 of the dense phase of catalyst particles is generally maintained below discharge head 5, thereby allowing cracking hydrocarbon products to disengage from the catalyst particles without substantial contact with the dense phase. However, if desired, the location of catalyst phase interface 6 may be varied from a position below discharge head 5 to a position above discharge head 5. In the latter case, increased conversion of the hydrocarbon feedstock will occur as a consequence of additional cracking taking place in the dense bed of catalyst in reactor vessel 4.

Vapors and entrained catalyst particles passing upward through reactor vessel 4 enter primary cyclone separator 7. Most of the entrained catalyst particles are separated in the first stage cyclone 7 and are discharged downwardly through dip-leg 8 and into the dense phase bed. Gases and remaining catalyst particles are passed through interstage cyclone line 11 to second stage cyclone separator 12 where substantially all of the remaining catalyst is separated and passed downwardly through dip-leg 13 and into the dense phase bed.

Effluent vapors pass from cyclone 12, through line 16, into plenum chamber 17, and are discharged from the reactor vessel 4 through line 18. Vapor line 18 conveys the hydrocarbon vapors to a fractionation zone, not shown, wherein the vapors are separated into product fractions by methods well known in the art.

Catalyst particles from the dense phase in the lower portion of the reactor vessel 4 pass downwardly into stripping zone 19. Baffles 20 are situated in stripping zone 19, and steam from line 21 is discharged through steam ring 22 into the lower portion of stripping zone 19. Steam rising through the stripping zone 19 removes volatile hydrocarbons from the catalyst particles and serves to fluidize the catalyst in the stripping zone 19 and in the dense phase of reactor vessel 4.

Stripped spent catalyst is withdrawn from the bottom of stripping zone 19 through spent catalyst standpipe 23 at a rate controlled by valve 24, and discharges through standpipe 25 into spent catalyst transfer line 26. Spent catalyst from standpipe 25 is fluidized with air from line 27 and passes upwardly through transfer line 26 and into regenerator vessel 28. Transfer line 26 terminates in a downwardly directed discharge head 29, and effluent from transfer line 26 is discharged below the surface 30 of the dense phase of fluidized catalyst particles in regenerator vessel 28. Catalyst within the regenerator vessel 28 is fluidized by the flow of combustion air through line 31 to air ring 32, whereupon coke on the spent catalyst is burned, resulting in the formation of carbon monoxide and carbon dioxide. The palladium and ruthenium incorporated in the cracking catalyst catalyze the combustion of this carbon monoxide and a substantially complete combustion of the carbon monoxide is effected within the dense phase with most of the resulting heat being absorbed by the catalyst particles undergoing regeneration. Combustion gases continuously pass upwardly from the dense phase and into the dilute phase above the catalyst phase interface 30. These combustion gases together with entrained catalyst enter primary cyclone separator 33. Most of the entrained catalyst particles are separated in the first stage cyclone 33 and are discharged downwardly through dip-leg 34 and into the dense phase. Combustion gases and remaining catalyst particles are passed through interstage cyclone line 36 to second stage cyclone separator 37 where substantially all of the remaining catalyst is separated and passed downwardly through dip-leg 38 and into the dense phase. Effluent gases from cyclone separator 37 pass through line 40, into plenum 41, and are discharged from regenerator vessel 28 through line 42. Effluent combustion gases from line 42 can be discharged directly to the atmosphere or, alternatively, can be passed through conventional heat exchange means prior to such discharge into the atmosphere.

Regenerated catalyst having a low content of residual coke is withdrawn from the bottom of regenerator vessel 28 through line 43 at a rate controlled by valve 44 to supply hot regenerated catalyst to standpipe 2 as described above.

Conversion of a selected hydrocarbon feedstock in a fluidized catalytic cracking process is effected by contact with a cracking catalyst, preferably in one or more fluidized transfer line reactors, at conversion temperature and at a fluidizing velocity which limits the conversion time to not more than about ten seconds. Conversion temperatures are desirably in the range from about 430° to about 700° C., preferably from about 450° to about 650° C., and most preferably from about 450° to about 565° C. Reactor effluent, comprising hydrocarbon vapors and cracking catalyst containing a deactivating quantity of carbonaceous material or coke, is then transferred to a separation zone. Hydrocarbon vapors are then separated from spent cracking catalyst and the catalyst stripped of volatile deposits before regeneration. The stripping zone can be suitably maintained at a temperature in the range from about 430° to about 700° C., preferably from about 450° to about 650° C., and most preferably from about 450° to about 565° C. The preferred stripping gas is steam, although inert gases, such as nitrogen or flue gases, or mixtures of steam with inert gases can also be used. The stripping gas is introduced at a pressure in the range from about 0.7 to about 2.5 kilograms per square centimeter above atmospheric pressure, and in an amount which is sufficient to effect substantially complete removal of volatile deposits from deactivated cracking catalyst. When steam is employed as the stripping gas, the weight ratio of stripping steam to cracking catalyst is in the range from about 0.0005 to about 0.025 and preferably in the range from about 0.0015 to about 0.0125.

In a fluidized catalytic cracking process, the regeneration zone temperatures are ordinarily in the range from about 565° to about 815° C. and are preferably in the range from about 620° to about 735° C. When air is used as the regeneration gas, it enters the bottom of the regenerator from a blower or compressor and a fluidizing velocity in the range from about 0.05 to about 1.5 meters per second and preferably from about 0.15 to about 0.90 meters per second is maintained in the regenerator. Regenerated catalyst is then recycled to the transfer line reactor for further use in the conversion of hydrocarbon feedstock.

The method of this invention can be used in a fluidized catalytic cracking process with wide variation in the cracking conditions. In the usual case where a gas oil feedstock is employed, the throughout ratio (TPR), or volume ratio of total feed to fresh feed, can vary from about 1.0 to about 3.0. Conversion level can vary from about 40% to about 100% where conversion is here defined as the percentage reduction of hydrocarbons boiling above 221° C. at atmospheric pressure by formation of lighter materials or coke. The weight ratio of catalyst to oil in the reactor can vary within the range from about 2 to about 20 so that the fluidized dispersion will have a density in the range from about 15 to about 320 kilograms per cubic meter. Fluidizing velocity may be in the range from about 3.0 to about 30 meters per second. This cracking process is preferably effected in a transfer line reactor wherein the ratio of length to average diameter is at least about 25.

Suitable hydrocarbon feedstocks for use in a fluidized catalytic cracking process in accordance with this invention include, but are not limited to, petroleum fractions such as light gas oils, heavy gas oils, wide-cut gas oils, vacuum gas oils, naphthas, decanted oils, residual fractions and cycle oils derived from any of these as well as hydrocarbon fractions derived from shale oils, tar sands processing, synthetic oils, coal liquefaction and the like. Any of these suitable feedstocks can be employed either singly or in any desired combination.

Another aspect of this invention comprises the use of the palladium-ruthenium oxidation promoter as the metallic promoter in the process which is disclosed by U.S. Pat. No. 4,153,535 to Vasalos et al. for reducing both carbon monoxide and sulfur oxide emissions from catalyst regeneration in a cyclic, fluidized, catalytic cracking process. This patent is hereby incorporated in its entirety by reference. In this embodiment, fluidizable particulate solids are circulated through the catalytic cracking process which comprise a metallic absorbent which absorbs sulfur oxides in the regeneration zone. These absorbed sulfur oxides are then released from the particulate solids as a sulfur-containing gas which comprises hydrogen sulfide by contacting the solids with the hydrocarbon feedstock in the reaction zone. In this embodiment, sulfur-containing carbonaceous deposits are burned in the regeneration zone in the presence of a sufficient amount of the palladium-ruthenium oxidation promoter to enhance both the absorption of sulfur oxides by the particulate solids and the conversion of carbon monoxide to carbon dioxide.

The metallic absorbent which absorbs sulfur oxides in the regeneration zone desirably comprises at least one free or combined metal selected from the group consisting of aluminum, sodium, magnesium, calcium, strontium, barium, scandium, titanium, chromium, molybdenum, manganese, cobalt, nickel, antimony, copper, zinc, cadmium, lead and the rare earth metals. More preferably, the metallic absorbent comprises at least one free or combined metal selected from the group consisting of aluminum, magnesium, zinc, titanium, calcium, and the rare earth metals. The oxide or oxides of the metallic element or elements of the metallic absorbent are believed to be primarily responsible for the absorption of sulfur oxides in the regeneration zone. Consequently, it is advantageous to introduce the metallic element or elements of the metallic absorbent into the catalytic cracking process cycle in the form of the oxide or oxides. It is sufficient, however, for the practice of this process that one or more suitable metallic elements be selected for use as the metallic absorbent and introduced into the process cycle. The metallic element or elements of the metallic absorbent are activated for the absorption of sulfur oxides in the regeneration zone as a consequence of the process steps involved in the catalytic cracking process cycle. The activation is substantially unaffected by the precise manner in which such metallic element or elements may be chemically combined when initially introduced into the process cycle.

In a particularly preferred embodiment, the metallic absorbent comprises at least one metal oxide selected from the group consisting of the oxides of aluminum, magnesium, zinc, titanium, calcium and the rare earth metals; and more preferably, the metallic absorbent comprises at least one oxide selected from the group consisting of alumina and magnesium oxide. Magnesium oxide is generally somewhat more efficient in absorbing sulfur oxides than is alumina but does not release absorbed sulfur oxides as readily as alumina upon contact with a hydrocarbon in the presence of a cracking catalyst. In addition, when fluidized solids are employed, particles comprising large amounts of magnesium oxide frequently have poor attrition properties relative to particles comprising large amounts of alumina. In view of the desirable attrition and sulfur oxide releasing properties of alumina, the inorganic oxide most preferably comprises alumina. Although the use of any form of alumina is contemplated for use in the practice of this invention, gamma-alumina and beta-alumina are preferred because of their usually large surface area.

The fluidizable particulate solids which comprise the metallic absorbent will desirably have an average size in the range from about 20 to about 150 microns and preferably less than about 50 microns. When the metallic absorbent comprises one or more metal oxides, the best results are generally obtained when the oxides have a large surface area. This surface area is desirably greater than about 10 square meters per gram, preferably greater than about 50 square meters per gram and ideally greater than about 100 square meters per gram.

The metallic absorbent can be circulated through the catalytic cracking process in any desired manner. The particles of cracking catalyst can contain the metallic absorbent. Alternatively, the particles of cracking catalyst can be physically mixed with a separate particulate solid which comprises the metallic absorbent. In addition, it will be appreciated that a combination of these two alternatives is also possible. The palladium and/or ruthenium of the oxidation promoter can be incorporated into or onto the same particulate solid which comprises the metallic absorbent, or can be incorporated into or onto a separate particulate solid or solids. A particularly convenient embodiment involves the use of the metallic absorbent, for example alumina, as a support for the palladium and ruthenium of this invention. The precise manner in which the metallic absorbent is associated with the palladium-ruthenium oxidation promoter of this invention is not critical.

The metallic absorbent can be incorporated into or onto a suitable support. This support should be porous and desirably has a surface area of at least about 10, preferably at least about 50, and most preferably at least about 100 square meters per gram. Large surface areas are desirable because they permit a more efficient contacting of the combustion gas containing sulfur oxides with the supported metallic absorbent. Suitable supports include, but are not limited to, silica, natural and treated clays, kieselguhr, diatomaceous earth, kaolin and mullite. In addition, one of the metal oxides suitable for use as a metallic absorbent, for example alumina, can be used as a support for one or more other metals or metal oxides which are also suitable for use as a metallic absorbent.

The metallic absorbent can comprise a component of a cracking catalyst as, for example, in the case of a silica-magnesia or silica-alumina catalyst. Also, the metallic absorbent can comprise at least a portion of the matrix of a zeolite-type cracking catalyst. A particularly preferred embodiment involves the use of alumina as the metallic absorbent which is provided in the form of a zeolite-type cracking catalyst having alumina in its matrix. The alumina content of such a matrix is desirably from about 10 to about 100 weight percent, preferably from about 40 to about 100 weight percent, and more preferably from about 60 to about 100 weight percent. The use of a zeolite-type cracking catalyst having a high alumina matrix, for example in excess of about 40 weight percent, provides a highly convenient manner in which to supply the metallic absorbent to the catalytic cracking process cycle. As the alumina content of the matrix increases, the ability of the cracking catalyst to absorb sulfur oxides in accordance with this invention also increases.

The palladium-ruthenium oxidation promoter and the metallic absorbent are employed in sufficient average amounts to provide reduced emissions of carbon monoxide and sulfur oxides in the regeneration zone effluent gas stream. Preferably, the promoter and the metallic absorbent are present in the regeneration zone in sufficient amount to effect the absorption of a major portion of the sulfur oxides produced by the burning of sulfur-containing coke therein. The combination of metallic absorbent and palladium-ruthenium promoter is preferably used in sufficient amount to effect the absorption of at least about 50%, more preferably greater than about 80%, and ideally more than about 90% of the sulfur oxides produced by such burning in the regeneration zone. As a result, the concentration of sulfur oxides in the regeneration zone effluent gas stream from this process can be maintained at less than about 600–1000 ppmv, advantageously at less than about 400 ppmv, and more advantageously at less than about 200 ppmv.

When both the metallic absorbent and the palladium-ruthenium promoter are circulated through the catalytic cracking process with the cracking catalyst, the combined amount of palladium and ruthenium, calculated as the elemental metals, is desirably from about 0.01 to about 100 ppm, and preferably from about 0.1 to about 25 ppm with respect to the total solids circulated through the process. In addition, the metallic absorbent comprises desirably from about 0.1 to about 70 weight percent, preferably from about 0.1 to about 50 weight percent, and more preferably from about 0.5 to about 30 weight percent of the total solids circulated through the process.

The palladium-ruthenium oxidation promoter of this invention and the metallic absorbent act together in a synergistic manner to absorb sulfur oxides more efficiently than would be expected from their individual abilities. Although the precise mechanism by which this synergism occurs is unclear, it is believed that the palladium-ruthenium promoter serves to catalyze the conversion of sulfur dioxide to sulfur trioxide which is more easily absorbed by the metallic absorbent.

Although the invention disclosed herein is not to be so limited, it is believed that chemical reaction occurs between the metallic absorbent and the sulfur oxides in the regeneration zone which results in the formation of nonvolatile inorganic sulfur compounds, such as sulfites and sulfates. This chemical transformation can be summarized in a simplified manner by the following equations:

$$M_xO + SO_2 \rightarrow M_xSO_3 + \tfrac{1}{2}O_2 \rightarrow M_xSO_4 \quad (6)$$

$$M_xO + SO_3 \rightarrow M_xSO_4 \quad (7)$$

where $M_xO$ is a metal oxide and x is the ratio of the oxidation state of the oxide ion to the oxidation state of a metal component M of the metallic absorbent when combined with oxygen. At very high temperatures, these sulfites and sulfates can undergo decomposition to liberate sulfur oxides and metal oxide. As a consequence of this reversal of the sulfur oxide absorption at high temperatures, the absorption of sulfur oxides is desirably effected at a temperature below about 900° C. and preferably below about 800° C.

The precise mechanism by which absorbed sulfur oxides are removed from the metallic absorbent is unknown, but it is believed that the combination of hydrocarbon and hydrocarbon cracking catalyst at elevated temperatures provides a reducing environment which effects a conversion of absorbed sulfur oxides to hydrogen sulfide while simultaneously reactivating the absorbent for further absorption of sulfur oxides. Although the invention is not to be so limited, it is believed that the removal of absorbed sulfur oxides can be summarized in a simplified manner by the following equations:

$$M_xSO_3 + 3H_2 \rightarrow M_xO + H_2S + 2H_2O \quad (8)$$

$$M_xSO_4 + 4H_2 \rightarrow M_xO + H_2S + 3H_2O \quad (9)$$

$$M_xSO_3 + 3H_2 \rightarrow M_xS + 3H_2O \rightarrow M_xO + H_2S + 2H_2O \quad (10)$$

$$M_xSO_4 + 4H_2 \rightarrow M_xS + 4H_2O \rightarrow M_xO + H_2S + 3H_2O \quad (11)$$

where x is the ratio of the oxidation state of the oxide ion to the oxidation state of a metal component M of the metallic absorbent when combined with oxygen. The removal of absorbed sulfur oxides from the metallic absorbent is generally improved by contacting the absorbent with added steam either simultaneously with or subsequent to treatment with a hydrocarbon in the presence of a cracking catalyst. It is believed that at least some metal sulfide is formed according to equations (10) and (11) above and that added steam serves to promote the conversion of these metal sulfides to hydrogen sulfide with simultaneous reactivation of the metallic absorbent.

The hydrogen sulfide which is produced during the removal of absorbed sulfur oxides from the metallic absorbent can be converted to elemental sulfur by any of the conventional techniques which are well known to the art as, for example, in a Claus unit.

When the palladium-ruthenium oxidation promoter of this invention is used in combination with a metallic absorbent to reduce emissions of both carbon monoxide and sulfur oxides from catalyst regeneration, the hydrocarbon feedstock can contain up to about 6.0 weight percent of sulfur in the form of organic sulfur compounds. The sulfur content of the feedstock can be, for example, from about 0.2 to about 6.0 weight percent, preferably from about 0.5 to about 5.0 weight percent, and more preferably from about 1 to about 4 weight percent.

With further reference to the use of the palladium-ruthenium oxidation promoter of this invention in combination with a metallic absorbent to reduce emissions of both carbon monoxide and sulfur oxides from catalyst regeneration, it is desirable that the regeneration zone effluent gas contain at least a small amount of molecular oxygen. Desirably, this effluent gas contains at least about 0.01 volume percent, preferably at least about 0.5 volume percent, more preferably at least about 1.0 volume percent, and ideally about 2.0 volume percent of molecular oxygen. The ability of the metallic absorbent to absorb sulfur oxides is generally improved as the amount of molecular oxygen in the effluent gas increases. Although the reason for this effect by molecular oxygen in uncertain, it is believed that increased concentrations of oxygen serve to promote the conversion of sulfur dioxide to sulfur trioxide. It is further believed that this sulfur trioxide is more easily absorbed by the metallic absorbent than is sulfur dioxide.

The following examples are intended only to illustrate the invention and are not to be construed as imposing limitations on the invention.

EXAMPLE 1

Two hundred grams of particulate alpha alumina monohydrate (CATAPAL-SB, obtained from the Conoco Chemicals Division of Continental Oil Company) analyzing for 74.2% $Al_2O_3$, 0.008% $SiO_2$, 0.005% $Fe_2O_3$, 0.004% $Na_2O$ and less than 0.01% sulfur, having a bulk density in the range from 660 to 740 grams per liter, and with 78% by weight of the particles having a size less than 90 microns, was impregnated with 125 ml of water and 75.0 ml of an aqueous solution of chloroplatinic acid which contained 0.2 percent by weight of platinum. The resulting material was dried and then calcined at 538° C. for 3 hours to give a particulate alumina containing 1000 ppm of platinum.

EXAMPLE 2

Forty milliliters of an aqueous palladium nitrate solution which contained 10% by weight of palladium was added dropwise to 200 milliliters of aqueous ammonia (28% $NH_3$). The resulting solution was boiled until the smell of ammonia disappeared, which was almost to dryness, and was then diluted with water to a total volume of one liter. A mixture of 150 milliliters of this solution and 150 milliliters of water was then used to impregnate 400 grams of particulate alpha alumina monohydrate (CATAPAL-SB) having the properties set forth in Example 1. The resulting material was dried and finally calcined at 538° C. for 3 hours to give a particulate alumina containing 2000 ppm of palladium.

EXAMPLE 3

A 202.9 gram sample of HOUDRY CCA-1 promoter (Houdry Division of Air Products and Chemicals, Inc.), analyzing for 72% $Al_2O_3$, 13.3% $SiO_2$, 0.20% platinum, 0.25% iron, 0.009% magnesium and 0.90% titanium, was calcined and impregnated with a mixture of 150 milliliters of water and 56 milliliters of an aqueous solution of ruthenium chloride containing 720 ppm of ruthenium. The resulting material was dried overnight at 121° C. and calcined at 538° C. for 3 hours. The calcined material was then ground to pass through a 100 mesh sieve to give a particulate solid containing 200 ppm of ruthenium and 2000 ppm of platinum.

EXAMPLE 4

A 148.5 gram sample of the particulate alumina containing 2000 ppm of palladium which was prepared according to Example 2 was impregnated with a mixture of 60 milliliters of water and 83 milliliters of an aqueous solution of ruthenium chloride containing 720 ppm of ruthenium. The resulting material was dried at 121° C. and subsequently calcined at 538° C. for 3 hours. The resulting particulate alumina contained 400 ppm of ruthenium and 2000 ppm of palladium.

EXAMPLE 5

Pilot plant cyclic fluidized catalytic cracking tests were conducted with a wide boiling gas oil feedstock having a sulfur content of 1.33 weight percent and a nitrogen content of 0.0841 weight percent. Equilibrium CBZ-1 cracking catalyst (Davison Chemical Division, W. R. Grace & Co.) containing a rare earth exchanged Y-zeolite and analyzing for 29.1% $Al_2O_3$, 0.46% $Na_2O$ and 0.11% Fe; and equilibrium HFZ-33 cracking catalyst (Houdry Division of Air Products and Chemicals, Inc.) containing a hydrogen exchanged Y-zeolite and analyzing for 59% $Al_2O_3$ and 37% $SiO_2$ were employed either individually or in admixture with various oxidation promoters. Test A was carried out with CBZ-1 catalyst, and Test B was carried out using HFZ-33 catalyst. Test C utilized a mixture of 99.8 parts by weight of equilibrium HFZ-33 catalyst with 0.2 parts by weight of the additive containing 1000 ppm of platinum prepared according to Example 1. Test D employed a mixture of 99.8 parts by weight of equilibrium HFZ-33 catalyst with 0.2 parts by weight of the additive containing 2000 ppm of palladium prepared according to Example 2. Test E employed a mixture of 99.8 parts by weight of equilibrium HFZ-33 catalyst with 0.2 parts by weight of HOUDRY CCA-1 promoter containing 2000 ppm of platinum. Test F employed a mixture of 99.8 parts by weight of equilibrium HFZ-33 catalyst with 0.2 parts by weight of the additive containing 200 ppm of ruthenium and 2000 ppm platinum prepared according to Example 3. Finally, Test G utilized a mixture of 99.8 parts by weight of equilibrium HFZ-33 catalyst with 0.2 parts by weight of the additive containing 400 ppm of ruthenium and 2000 ppm of palladium prepared according to Example 4. All of the additives were steamed at 760° C. (100% steam at atmospheric pressure) for 5 hours prior to use. The results of these pilot plant tests are set forth in Tables 1 and 2.

CBZ-1 catalyst is a low alumina cracking catalyst which is essentially unable to absorb sulfur oxides in the regeneration zone. Comparison of Tests A and B illustrates the ability of HFZ-33 catalyst, a high alumina cracking catalyst, to reduce regenerator $SO_x$ emissions from 760 to 188 ppmv or 75%. Tests C-E illustrate that the combination of HFZ-33 catalyst with from 2.0 to 4.0 ppm of platinum or palladium results in a further reduction of $SO_x$ emissions to 58-85 ppmv, which represents a reduction of about 90% with respect to the 760 ppmv obtained with CBZ-1 catalyst (Test A). The improved reduction of $SO_x$ emissions which is obtained through the use of a platinum or palladium oxidation promoter is accompanied, however, by a large and undesirable increase of $NO_x$ emissions from 34 ppmv for HFZ-33 catalyst (Test B) to 178-228 ppmv (Tests C-E). Comparison of Tests E and F illustrates that 4 ppm of platinum and 0.4 ppm of ruthenium in combination with HFZ-33 catalyst (Test F) results in $SO_x$ and $NO_x$ emissions which are essentially identical to those which are produced by a combination of HFZ-33 catalyst and 4 ppm of platinum in the absence of any ruthenium (Test E). Similarly, comparison of Tests D and G illustrates that 4 ppm of palladium and 0.8 ppm of ruthenium in combination with HFZ-33 (Test G) results in $SO_x$ emissions which are essentially identical with those which are obtained with a combination of HFZ-33 catalyst and 4 ppm of palladium in the absence of any ruthenium (Test D). In distinct contrast, however, the combination of 4 ppm of palladium and 0.8 ppm of ruthenium (Test G) results in $NO_x$ emissions of only 131 ppmv, which represents a 26–43% reduction from the 178–228 ppmv of $NO_x$ produced by the platinum, palladium, and platinum-ruthenium promoters (Tests C-F). Finally, comparison of Tests A and B with Tests C-G illustrates that platinum and palladium as well as platinum-ruthenium and palladium-ruthenium combinations are all effective in promoting the combustion of carbon monoxide within the regeneration zone.

TABLE 1

| Catalyst: | A<br>CBZ-1 | B<br>HFZ-33 | C<br>HFZ-33 | D<br>HFZ-33 |
|---|---|---|---|---|
| Oxidation Promoter: | | | | |
| Platinum, ppm | 0.0 | 0.0 | 2.0 | 0.0 |
| Palladium, ppm | 0.0 | 0.0 | 0.0 | 4.0 |
| Ruthenium, ppm | 0.0 | 0.0 | 0.0 | 0.0 |
| Cracking Conditions: | | | | |
| Temp., °C. | 510 | 510 | 510 | 510 |
| Feed rate, g./min. | 9 | 9 | 9 | 9 |
| Stripping Conditions: | | | | |
| Temp., °C. | 470 | 496 | 496 | 497 |
| Steam, g./hr. | 16 | 16 | 16 | 16 |
| Nitrogen, std. cu. m./hr. | 0.031 | 0.031 | 0.031 | 0.031 |
| Regeneration Conditions: | | | | |
| Temp., °C. | 649 | 649 | 649 | 648 |
| Flue gas composition: | | | | |
| $CO_2$, vol. % | 10.9 | 11.3 | 11.7 | 11.9 |
| CO, vol. % | 1.7 | 0.47 | 0.0 | 0.0 |
| $O_2$, vol. % | 2.1 | 2.3 | 2.3 | 2.0 |
| $H_2S$, ppmv | 134 | 82 | 22 | 69 |
| $SO_x$, ppmv[a] | 760 | 188 | 58 | 80 |
| $NO_x$, ppmv[b] | 8 | 34 | 228 | 178 |
| Catalyst Analysis: | | | | |
| Coke on spent cat., wt. % | 0.768 | 0.663 | 0.665 | 0.682 |
| Coke on regen. cat., wt. % | 0.038 | 0.027 | 0.032 | 0.036 |
| Sulfate on spent cat., ppm | 64 | 52 | 40 | <4 |
| Sulfate on regen. cat., ppm | 80 | 124 | 144 | 136 |

[a] Represents the sum of $SO_2$ and $SO_3$.
[b] Represents the sum of all nitrogen oxides presents.

TABLE 2

| Catalyst: | Test | | |
|---|---|---|---|
| | E<br>HFZ-33 | F<br>HFZ-33 | G<br>HFZ-33 |
| Oxidation Promoter: | | | |
| Platinum, ppm | 4.0 | 4.0 | 0.0 |
| Palladium, ppm | 0.0 | 0.0 | 4.0 |
| Ruthenium, ppm | 0.0 | 0.4 | 0.8 |
| Cracking Conditions: | | | |
| Temp., °C. | 509 | 509 | 510 |
| Feed rate, g./min. | 9 | 9 | 9 |
| Stripping Conditions: | | | |
| Temp., °C. | 496 | 496 | 496 |
| Steam, g./hr. | 16 | 16 | 16 |
| Nitrogen, std., cu. m./hr. | 0.031 | 0.031 | 0.031 |
| Regeneration Conditions: | | | |
| Temp., °C. | 651 | 650 | 651 |
| Flue gas composition: | | | |
| $CO_2$, vol. % | 11.7 | 11.8 | 11.9 |
| CO, vol. % | 0.0 | 0.0 | 0.0 |
| $O_2$, vol. % | 2.0 | 2.2 | 2.1 |
| $H_2S$, ppmv | 58 | 24 | 76 |
| $SO_x$, ppmv[a] | 85 | 56 | 84 |
| $NO_x$, ppmv[b] | 216 | 219 | 131 |
| Catalyst Analysis: | | | |
| Coke on spent cat., wt. % | 0.942 | 0.674 | 0.692 |
| Coke on regen. cat., wt. % | 0.021 | 0.026 | 0.034 |
| Sulfate on spent cat., ppm | 60 | 52 | 48 |
| Sulfate on regen. cat., ppm | 160 | 148 | 132 |

[a] Represents the sum of $SO_2$ and $SO_3$.
[b] Represents the sum of all nitrogen oxides present.

We claim:

1. A composition of matter comprising a particulate physical mixture of:
   (a) a particulate zeolite-type cracking catalyst; and
   (b) a particulate solid other than said cracking catalyst comprising an inorganic oxide in association with palladium and ruthenium, wherein the palladium and ruthenium are in free or combined form, the ratio by weight of an elemental basis of palladium to ruthenium is from about 0.1 to about 10, the combined amount of palladium and ruthenium is from about 0.001 to about 10 weight percent with respect to the particulate solid other than said cracking catalyst, and the combined amount of palladium and ruthenium is from about 0.01 to about 100 parts per million by weight with respect to said particulate physical mixture.

2. The composition as set forth in claim 1 wherein the amount of said cracking catalyst is from about 50 to about 99.999 weight percent with respect to said particulate physical mixture.

3. The composition as set forth in claim 2 wherein the combined amount of palladium and ruthenium is from about 0.1 to about 25 parts per million by weight with respect to said particulate physical mixture.

4. The composition as set forth in claim 3 wherein said inorganic oxide comprises at least one material selected from the group consisting of the oxides of aluminum, magnesium, zinc, titanium, calcium and the rare earth metals.

5. The composition as set forth in claim 4 wherein said inorganic oxide comprises alumina.

6. The composition as set forth in claim 3 wherein said inorganic oxide comprises at least one material selected from the group consisting of silica, natural and treated clays, kieselguhr, diatomaceous earth, kaolin and mullite.

7. The composition as set forth in claim 3 wherein the amount of palladium and ruthenium is from about 0.01 to about 1.0 weight percent with respect to the particulate solid other than said cracking catalyst.

8. The composition as set forth in claim 7 wherein said ratio of palladium to ruthenium is from about 1.0 to about 10.

* * * * *